US012023944B2

(12) United States Patent
Mochizuki

(10) Patent No.: US 12,023,944 B2
(45) Date of Patent: Jul. 2, 2024

(54) THREE-DIMENSIONAL OBJECT PRINTING APPARATUS AND THREE-DIMENSIONAL OBJECT PRINTING METHOD

(71) Applicant: SEIKO EPSON CORPORATION, Tokyo (JP)

(72) Inventor: Kenju Mochizuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 17/662,781

(22) Filed: May 10, 2022

(65) Prior Publication Data

US 2022/0363080 A1 Nov. 17, 2022

(30) Foreign Application Priority Data

May 13, 2021 (JP) ................................ 2021-081452

(51) Int. Cl.

*B41J 3/407* (2006.01)
*B41J 25/00* (2006.01)
*B41J 2/145* (2006.01)

(52) U.S. Cl.

CPC .............. *B41J 3/4073* (2013.01); *B41J 2/145* (2013.01); *B41J 25/001* (2013.01)

(58) Field of Classification Search

CPC ......... B41J 3/4073; B41J 2/145; B41J 25/001
See application file for complete search history.

(56) References Cited

U.S. PATENT DOCUMENTS

| | | | | |
|---|---|---|---|---|
| 7,559,640 B2 * | 7/2009 | Iwata | ..................... | B41J 19/202 347/101 |
| 9,630,396 B2 * | 4/2017 | Orr | ........................ | B33Y 50/02 |
| 2014/0063096 A1 | 3/2014 | Pitz et al. | | |

FOREIGN PATENT DOCUMENTS

JP 2014-050832 A 3/2014

* cited by examiner

*Primary Examiner* — Geoffrey S Mruk
(74) *Attorney, Agent, or Firm* — WORKMAN NYDEGGER

(57) ABSTRACT

A three-dimensional object printing apparatus includes a head that discharges a liquid, and a robot that changes relative positions and poses of a workpiece and the head. A first speed adjustment operation in which a moving speed adjusted while the robot moves a position of the head from a printing preparation position toward a printing start position closer to the print region than the printing preparation position, and a printing operation in which the head starts discharging the liquid at the printing start position and the robot changes a position and a pose of the head while the liquid is discharged from the head are executed, and an amount of change in the pose of the head per unit period during the first speed adjustment operation is less than an amount of change in the pose of the head per unit period during the printing operation.

10 Claims, 10 Drawing Sheets

THREE-DIMENSIONAL OBJECT PRINTING APPARATUS AND THREE-DIMENSIONAL OBJECT PRINTING METHOD

The present application is based on, and claims priority from JP Application Serial Number 2021-081452, filed May 13, 2021, the disclosure of which is hereby incorporated by reference herein in its entirety.

BACKGROUND

1. Technical Field

The present disclosure relates to a three-dimensional object printing apparatus and a three-dimensional object printing method.

2. Related Art

In the related art, a three-dimensional object printing apparatus that performs printing on a surface of a three-dimensional workpiece by an ink jet method has been known. For example, JP-A-2014-050832 discloses a three-dimensional object printing apparatus that includes a head that discharges a liquid such as ink to a print region on a workpiece and a robot that supports the head and changes relative positions of the workpiece and the head.

However, in the above-mentioned related art, there is a concern that vibration is caused in the robot due to the movement of the head during execution of printing, the vibration caused in the robot propagates to the head, and printing quality deteriorates.

SUMMARY

According to an aspect of the present disclosure, there is provided a three-dimensional object printing apparatus including a head that discharges a liquid to a print region on a three-dimensional workpiece, and a robot that supports the head, and changes relative positions and poses of the workpiece and the head. A first speed adjustment operation in which a moving speed of the head is adjusted while the robot moves a position of the head from a printing preparation position toward a printing start position closer to the print region than the printing preparation position, and a printing operation in which the head starts discharging the liquid to the print region at the printing start position and the robot changes a position and a pose of the head while the liquid is discharged from the head are executed, and an amount of change in the pose of the head per unit period during the execution of the first speed adjustment operation is less than an amount of change in the pose of the head per unit period during the execution of the printing operation.

According to another aspect of the present disclosure, there is provided a three-dimensional object printing method using a head that discharges a liquid to a print region on a three-dimensional workpiece, and a robot that supports the head and changes relative positions and poses of the workpiece and the head. The method includes executing a first speed adjustment operation in which a moving speed of the head is adjusted while the robot moves a position of the head from a printing preparation position toward a printing start position closer to the print region than the printing preparation position, and a printing operation in which the head starts discharging the liquid to the print region at the printing start position and the robot moves the head and changes a pose of the head while the liquid is discharged from the head. An amount of change in the pose of the head per unit period during the execution of the first speed adjustment operation is less than an amount of change in the pose of the head per unit period during the execution of the printing operation.

DESCRIPTION OF EXEMPLARY EMBODIMENTS

Figure 1:
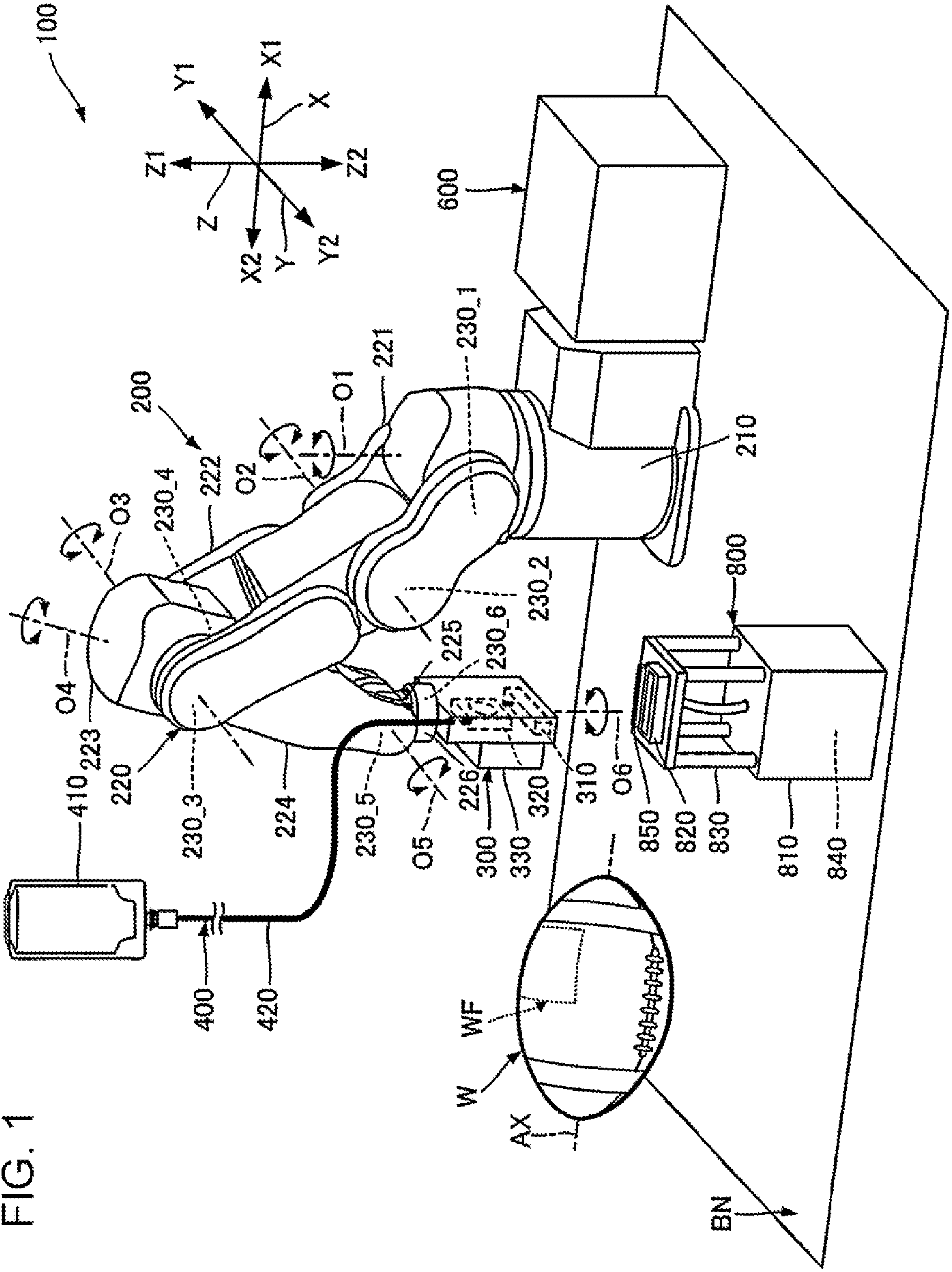
FIG. 1 is a perspective view illustrating an outline of a three-dimensional object printing apparatus according to a first embodiment.

Hereinafter, preferred embodiments according to the present disclosure will be described with reference to the accompanying drawings. In the drawings, dimensions or scales of portions are appropriately different from the actual dimensions or scales, and some portions are schematically illustrated for easy understanding. The scope of the present disclosure is not limited to these forms unless otherwise particularly stated to limit the present disclosure in the following description.

The following description will be performed by using an X-axis, a Y-axis, and a Z-axis that intersect each other as appropriate. One direction along the X-axis is referred to as an X1 direction, and a direction opposite to the X1 direction is referred to as an X2 direction. Similarly, directions opposite to each other along the Y-axis are referred to as a Y1 direction and a Y2 direction. Directions opposite to each other along the Z-axis are referred to as a Z1 direction and a Z2 direction.

Here, the X-axis, the Y-axis, and the Z-axis are coordinate axes of a base coordinate system set in a space in which a workpiece W and a base portion 210 to be described later are installed. Typically, the Z-axis is a vertical axis, and the Z2 direction corresponds to a downward direction in a vertical direction. The Z-axis may not be a vertical axis. Although the X-axis, the Y-axis, and the Z-axis are typically orthogonal to each other, the present disclosure is not limited thereto, and the axes may not be orthogonal to each other. For example, the X-axis, Y-axis, and Z-axis may intersect each other at an angle within a range of 80° or more and 100° or less.

1. First Embodiment

1-1. Outline of Three-Dimensional Object Printing Apparatus

FIG. 1 is a perspective view illustrating an outline of a three-dimensional object printing apparatus 100 according to a first embodiment. The three-dimensional object printing apparatus 100 is an apparatus that prints on a print region WF of a part of a surface of a three-dimensional workpiece W by an ink jet method. In FIG. 1, the print region WF is a part of the surface of the workpiece W, but may be the entire surface.

In the example illustrated in FIG. 1, the workpiece W is a rugby ball forming a long sphere around a long axis AX, and the print region WF is a curved surface having a substantially constant curvature. However, the print region WF may be a curved surface having a non-constant curvature. In the present embodiment, the workpiece W is disposed such that the long axis AX is parallel to the X-axis. The workpiece W is not limited to the rugby ball. For example, the workpiece W is some product, and printing in the print region WF is one of a series of steps for manufacturing this product. An aspect of a shape and a size of the workpiece W are not limited to the example illustrated in FIG. 1, and may be any aspect. For example, the surface of the workpiece W may have a surface such as a flat surface, a stepped surface, or an uneven surface. An installation pose of the workpiece W is not limited to the example illustrated in FIG. 1, and is any pose.

In the example illustrated in FIG. 1, the three-dimensional object printing apparatus 100 is an ink jet printer using a vertical articulated robot. Specifically, as illustrated in FIG. 1, the three-dimensional object printing apparatus 100 includes a robot 200, a liquid discharge unit 300, a liquid supply unit 400, a controller 600, and a maintenance unit 800. Hereinafter, first, each portion of the three-dimensional object printing apparatus 100 illustrated in FIG. 1 will be briefly described in sequence.

The robot 200 is a moving mechanism that changes a position and a pose of the liquid discharge unit 300 with respect to the workpiece W. In the example illustrated in FIG. 1, the robot 200 is a so-called 6-axis vertical articulated robot. Specifically, the robot 200 has a base portion 210 and an arm 220.

The base portion 210 is a base that supports the arm 220. In the example illustrated in FIG. 1, the base portion 210 is fixed to an installation surface BN such as a floor surface facing the Z1 direction by screwing or the like. The installation surface BN to which the base portion 210 is fixed may be a surface facing any direction, but is not limited to the example illustrated in FIG. 1, and may be, for example, a surface of a wall, a ceiling, a movable carriage, or the like.

The arm 220 is a 6-axis robot arm having a base end attached to the base portion 210 and a tip portion of which a position and a pose are three-dimensionally changed with respect to the base end. Specifically, the arm 220 has an arm component 221, an arm component 222, an arm component 223, an arm component 224, an arm component 225, and an arm component 226, and these arm components are coupled in this order.

The arm component 221 is rotatably coupled to the base portion 210 around a rotation axis O1 via a joint 230_1. The arm component 222 is rotatably coupled to the arm component 221 around a rotation axis O2 via a joint 230_2. The arm component 223 is rotatably coupled to the arm component 222 around a rotation axis O3 via a joint 230_3. The arm component 224 is rotatably coupled to the arm component 223 around a rotation axis O4 via a joint 230_4. The arm component 225 is rotatably coupled to the arm component 224 around a rotation axis O5 via a joint 230_5. The arm component 226 is rotatably coupled to the arm component 225 around a rotation axis O6 via a joint 230_6. Hereinafter, each of the joint 230_1 to the joint 230_6 may be referred to as the joint 230.

Each of the joint 230_1 to the joint 230_6 is a mechanism for rotatably coupling one of two adjacent arm components to the other arm component. Here, the rotation of joints 230 can be expressed as the movement of joints 230 in the present embodiment. Although not illustrated in FIG. 1, a drive mechanism for rotating one of two adjacent arm components with respect to the other arm component is provided in each of the joints 230_1 to 230_6. The drive mechanism includes, for example, a motor that generates a driving force for the rotation, a speed reducer that decelerates and outputs the driving force, and an encoder such as a rotary encoder that detects an operation amount of an angle of the rotation or the like. An aggregate of the drive mechanisms corresponds to an arm drive mechanism 240 illustrated in FIG. 2 to be described later. The encoder corresponds to an encoder 241 illustrated in FIG. 2 and the like to be described later.

The rotation axis O1 is an axis perpendicular to the installation surface BN to which the base portion 210 is fixed. The rotation axis O2 is an axis perpendicular to the rotation axis O1. The rotation axis O3 is an axis parallel to the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

As for these rotation axes, a case where one axis is "perpendicular" to the other axis includes a case where an angle formed by the two rotation axes is strictly 90 degrees and a case where the angle formed by the two rotation axes deviates within a range of about 90 degrees to ±5 degrees. Similarly, a case where one axis is "parallel" to the other axis includes a case where the two rotation axes are strictly parallel and a case where one of the two rotation axes tilts with respect to the other axis within a range of about ±5 degrees.

The liquid discharge unit 300 is attached, as an end effector, to the tip portion of the arm 220, that is, the arm component 226 in a state of being fixed by screwing or the like.

The liquid discharge unit 300 is a device having a head 310 that discharges ink which is an example of a liquid toward the workpiece W. In the present embodiment, the liquid discharge unit 300 includes a pressure adjustment valve 320 that adjusts a pressure of the ink to be supplied to the head 310, and a sensor 330 that measures a distance from the workpiece W in addition to the head 310. Since both the pressure adjustment valve 320 and the sensor 330 are fixed to the arm component 226, a relationship between the positions and the poses is fixed.

The ink is not particularly limited, and is, for example, an aqueous ink in which a coloring material such as a dye or a pigment is dissolved in an aqueous solvent, a curable ink using a curable resin such as an ultraviolet curable type, a solvent-based ink in which a coloring material such as a dye or a pigment is dissolved in an organic solvent, and the like may be used. The ink is not limited to a solution, and may be an ink in which a coloring material or the like is dispersed, as a dispersant, in a dispersion medium. The ink is not limited to the ink containing the coloring material, and may be an ink containing, as a dispersant, conductive particles such as metal particles for forming a wiring or the like.

Although not illustrated in FIG. 1, the head 310 has piezoelectric elements, cavities for accommodating the ink, and nozzles communicatively coupled to the cavities. Here, the piezoelectric element is provided for each cavity, and the ink is discharged from the nozzle corresponding to the cavity by individually changing a pressure of the cavity. Such a head 310 is obtained, for example, by bonding a plurality of substrates such as a silicon substrate processed appropriately by etching or the like with an adhesive or the like. The piezoelectric element corresponds to a piezoelectric element 311 illustrated in FIG. 2 to be described later. As a driving element for discharging the ink from the nozzles, a heater for heating the ink in the cavities may be used instead of the piezoelectric elements.

The pressure adjustment valve 320 is a valve mechanism that opens and closes according to the pressure of the ink in the head 310. By this opening and closing, the pressure of the ink in the head 310 is maintained at a negative pressure within a predetermined range. Thus, a meniscus of the ink formed in a nozzle N is stabilized.

The sensor 330 is an optical displacement sensor that measures a distance between the head 310 and the workpiece W.

The liquid supply unit 400 is a mechanism for supplying the ink to the head 310. The liquid supply unit 400 has a liquid reservoir 410 and a supply flow path 420.

The liquid reservoir 410 is a container that reserves the ink. The liquid reservoir 410 is, for example, a bag-shaped ink pack made of a flexible film.

The supply flow path 420 is a flow path for supplying the ink from the liquid reservoir 410 to the head 310. The pressure adjustment valve 320 is provided in the middle of the supply flow path 420. Thus, even though a positional relationship between the head 310 and the liquid reservoir 410 changes, a fluctuation in the pressure of the ink in the head 310 can be reduced.

The supply flow path 420 is, for example, an internal space of a pipe body. Here, the pipe body used for the supply flow path 420 is made of, for example, a rubber material or an elastic material, and has flexibility. Accordingly, even though the position or the pose of the head 310 changes while the position and the pose of the liquid reservoir 410 are fixed, the ink can be supplied from the liquid reservoir 410 to the pressure adjustment valve 320.

The controller 600 is a robot controller that controls the driving of the robot 200. Although not illustrated in FIG. 1, a control module for controlling a discharge operation in the liquid discharge unit 300 is electrically coupled to the controller 600. A computer is coupled to the controller 600 and the control module so as to be able to communicate with. The control module corresponds to a control module 500 illustrated in FIG. 2 to be described later. The computer corresponds to a computer 700 illustrated in FIG. 2 to be described later.

The maintenance unit 800 is a mechanism for performing maintenance on the head 310 of the liquid discharge unit 300. In the example illustrated in FIG. 1, the maintenance unit 800 includes a case 810, a cap portion 820, a support base 830, a suction mechanism 840, and a wiper portion 850. As illustrated in FIG. 1, the case 810 is fixed to the installation surface BN by screwing or the like, similarly to the base portion 210 of the robot 200. However, the case 810 may be fixed to a surface different from the installation surface BN to which the base portion 210 is fixed. The maintenance is a concept including covering a nozzle surface F of the head 310 with the cap portion 820, performing suction by the suction mechanism 840, and wiping with the wiper portion 850.

1-2. Electrical Configuration of Three-Dimensional Object Printing Apparatus

Figure 2:
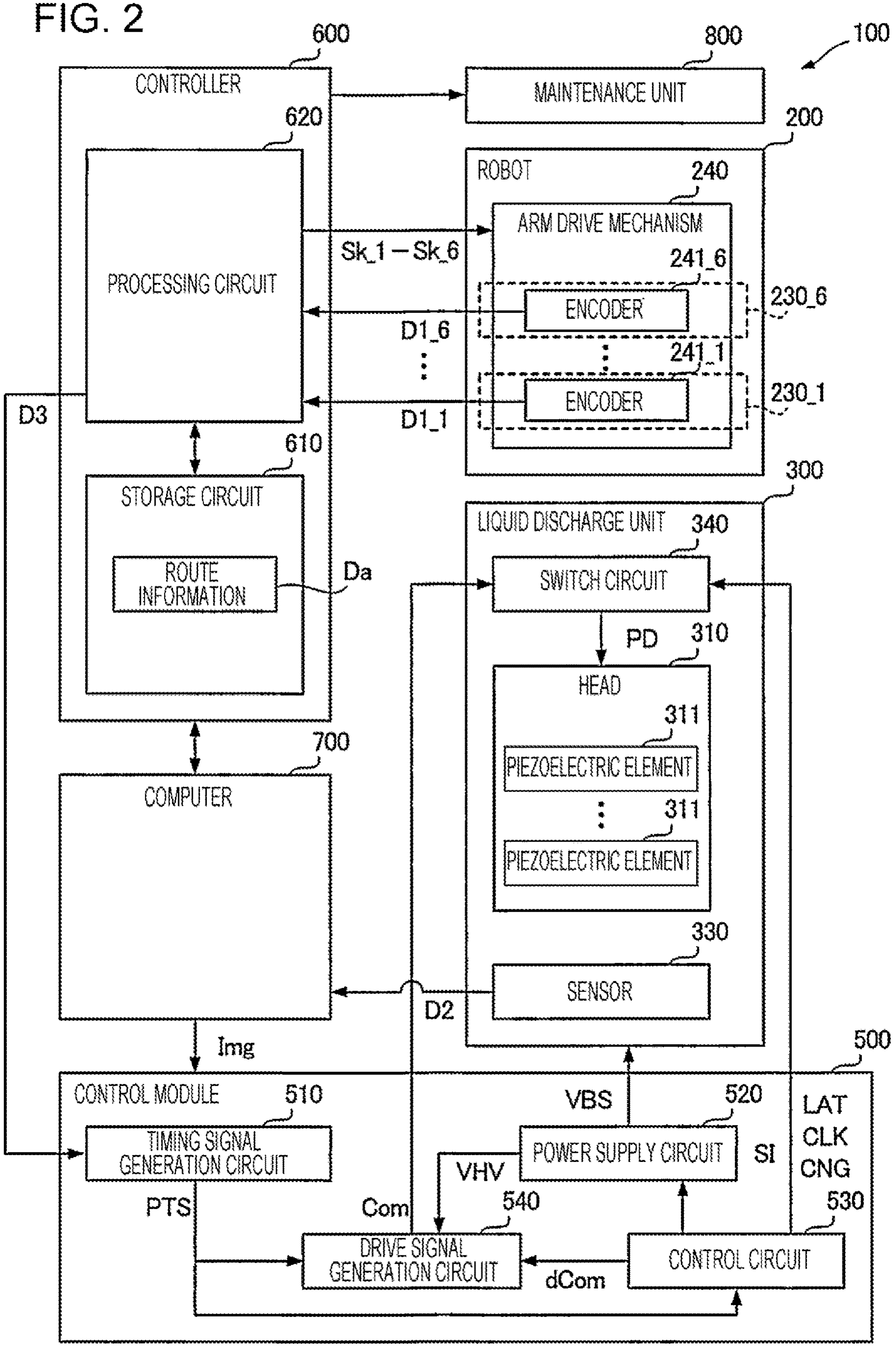
FIG. 2 is a block diagram illustrating an electrical configuration of the three-dimensional object printing apparatus according to the first embodiment.

FIG. 2 is a block diagram illustrating an electrical configuration of the three-dimensional object printing apparatus 100 according to the first embodiment. FIG. 2 illustrates electrical components among the components of the three-dimensional object printing apparatus 100. FIG. 2 illustrates the arm drive mechanism 240 including an encoder 241_1 to an encoder 241_6. The arm drive mechanism 240 is the aggregate of the above-mentioned drive mechanisms that move the joint 230_1 to the joint 230_6. The encoder 241_1 to the encoder 241_6 are provided so as to correspond to the joint 230_1 to the joint 230_6, respectively, and measure operation amounts such as rotation angles of the encoder 241_1 to the encoder 241_6. Hereinafter, each of the encoder 241_1 to the encoder 241_6 may be referred to as the encoder 241.

As illustrated in FIG. 2, the three-dimensional object printing apparatus 100 includes the control module 500, and the computer 700 in addition to the robot 200, the liquid discharge unit 300, the controller 600, and the maintenance unit 800 described above. Each of the electrical components to be described below may be divided appropriately, a part thereof may be included in another component, or may be integrally formed with another component. For example, a part or all of functions of the control module 500 or the controller 600 may be realized by the computer 700 coupled to the controller 600, or may be realized by another external device such as a personal computer (PC) coupled to the controller 600 via a network such as a local area network (LAN) or the Internet.

The controller 600 has a function of controlling the driving of the robot 200 and a function of generating a signal D3 for synchronizing a discharge operation of the head 310 with an operation of the robot 200. The controller 600 of the present embodiment also has a function of controlling the driving of the maintenance unit 800, and this function may be realized by another device such as the computer 700.

The controller 600 has a storage circuit 610 and a processing circuit 620.

The storage circuit 610 stores various programs executed by the processing circuit 620 and various kinds of data processed by the processing circuit 620. A part or all of the storage circuit 610 may be included in the processing circuit 620.

Route information Da is stored in the storage circuit 610. The route information Da is information indicating a route along which the head 310 moves. Specifically, the route information Da includes information indicating a route along which a tool center point indicating an origin of a tool coordinate system moves. The route information Da is represented by using, for example, coordinate values of the base coordinate system. The route information Da is determined based on workpiece information indicating a position and a shape of the workpiece W and information indicating a position and a shape of the maintenance unit 800, and is input from the computer 700 to the storage circuit 610.

The processing circuit 620 controls movements of the joint 230_1 to the joint 230_6 based on the route information Da, and generates the signal D3. Specifically, the processing circuit 620 performs an inverse kinematics calculation which is a calculation for converting the route information Da into an operation amount such as a rotation angle and a rotation speed of each of the joint 230_1 to the joint 230_6. The processing circuit 620 outputs a control signal Sk_1 to a control signal Sk_6 based on an output signal D1_1 to an output signal D1_6 of the encoder 241_1 to the encoder 241_6 included in the arm drive mechanism 240 of the robot 200 such that an operation amount such as an actual rotation angle and an actual rotation speed of each of the joint 230_1 to the joint 230_6 becomes the above-described calculation result. Each of the control signal Sk_1 to the control signal Sk_6 corresponds to each of the joint 230_1 to the joint 230_6, and controls the driving of the motor provided in the corresponding joint 230. Each of the output signal D1_1 to the output signal D1_6 corresponds to each of the encoder 241_1 to the encoder 241_6. Hereinafter, each of the output signal D1_1 to the output signal D1_6 may be referred to as an output signal D1.

The processing circuit 620 generates the signal D3 based on the output signal D1 from at least one of the encoder 241_1 to the encoder 241_6. The processing circuit 620 described above includes, for example, one or more processors such as a central processing unit (CPU).

The control module 500 is a circuit that controls the discharge operation of the head 310 based on the signal D3 output from the controller 600 and print data Img from the computer 700. The control module 500 includes a timing signal generation circuit 510, a power supply circuit 520, a control circuit 530, and a drive signal generation circuit 540.

The timing signal generation circuit 510 generates a timing signal PTS based on the signal D3. The timing signal generation circuit 510 is, for example, a timer that starts generating the timing signal PTS when the signal D3 is detected.

The power supply circuit 520 receives a power from a commercial power supply (not illustrated) and generates various predetermined potentials. The generated various potentials are appropriately supplied to each portion of the three-dimensional object printing apparatus 100. For example, the power supply circuit 520 generates a power supply potential VHV and an offset potential VBS. The offset potential VBS is supplied to the liquid discharge unit 300. The power supply potential VHV is supplied to the drive signal generation circuit 540.

The control circuit 530 generates a control signal SI, a waveform designation signal dCom, a latch signal LAT, a clock signal CLK, and a change signal CNG based on the timing signal PTS. These signals are synchronized with the timing signal PTS. Of these signals, the waveform designation signal dCom is input to the drive signal generation circuit 540, and the other signals are input to a switch circuit 340 of the liquid discharge unit 300. The control circuit 530 includes, for example, one or more processors such as a central processing unit (CPU).

The control signal SI is a digital signal for designating an operation state of the piezoelectric element 311 included in the head 310. Specifically, the control signal SI designates whether or not to supply the drive signal Com, to be described later, to the piezoelectric element 311. By this designation, for example, whether or not to discharge the ink from the nozzle corresponding to the piezoelectric element 311 is individually designated, and the amount of ink discharged from the nozzle is designated. The waveform designation signal dCom is a digital signal for defining a waveform of the drive signal Com. The latch signal LAT and the change signal CNG are used in combination with the control signal SI, and define a drive timing of the piezoelectric element 311 to define a discharge timing of the ink from the nozzle. The clock signal CLK is a reference clock signal synchronized with the timing signal PTS. Of the above signals, the signal input to the switch circuit 340 of the liquid discharge unit 300 will be described in detail later.

The drive signal generation circuit 540 is a circuit that generates a drive signal Com for driving each piezoelectric element 311 included in the head 310. Specifically, the drive signal generation circuit 540 has, for example, a DA conversion circuit and an amplifier circuit. In the drive signal generation circuit 540, the DA conversion circuit converts a waveform designation signal dCom from the control circuit 530 from a digital signal to an analog signal, and the amplifier circuit amplifies the analog signal by using the power supply potential VHV from the power supply circuit 520 and generates the drive signal Com. Here, among waveforms included in the drive signal Com, a signal of the waveform actually supplied to the piezoelectric element 311 is a drive pulse PD. The drive pulse PD is supplied from the drive signal generation circuit 540 to the piezoelectric element 311 via the switch circuit 340. The switch circuit 340 switches whether to supply, as the drive pulse PD, at least a part of the waveforms included in the drive signal Com based on a control signal SI.

The computer 700 has a function of supplying information such as the route information Da to the controller 600 and a function of supplying information such as the print data Img to the control module 500. The computer 700 of the present embodiment is electrically coupled to the sensor 330 described above, and supplies information for correcting the route information Da to the controller 600 based on the signal D2 from the sensor 330. The computer 700 functions as a controller of the three-dimensional object printing apparatus 100, and causes the robot 200 and the liquid discharge unit 300 to execute a printing operation to be described later and a series of operations included before and after the printing operation via the controller 600 and the control module 500.

1-3. Liquid Discharge Unit

Figure 3:
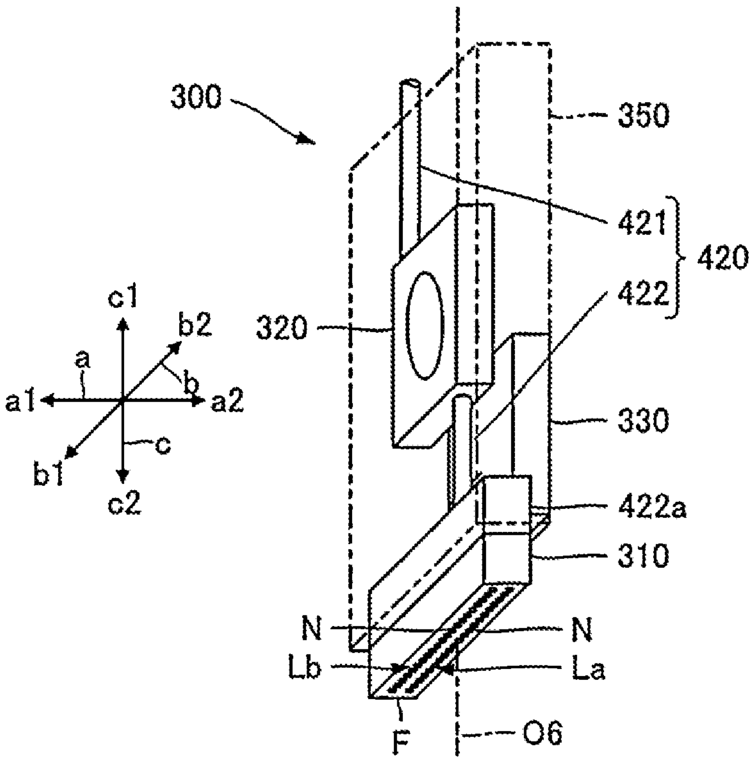
FIG. 3 is a perspective view illustrating a schematic configuration of a liquid discharge unit according to the first embodiment.

FIG. 3 is a perspective view illustrating a schematic configuration of the liquid discharge unit 300 according to the first embodiment.

The following description will be performed by using an a-axis, a b-axis, and a c-axis that intersect each other as appropriate. One direction along the a-axis is referred to as an a1 direction, and a direction opposite to the a1 direction is referred to as an a2 direction. Similarly, directions opposite to each other along the b-axis are referred to as a b1 direction and a b2 direction. Directions opposite to each other along the c-axis are referred to as a c1 direction and a c2 direction.

Here, the a-axis, the b-axis, and the c-axis are coordinate axes of a tool coordinate system set in the liquid discharge unit 300, and a relationship between a position and a pose relative to the above-mentioned X-axis, Y-axis, and Z-axis changes by the operation of the above-mentioned robot 200. In the example illustrated in FIG. 3, the c-axis is an axis parallel to the above-mentioned rotation axis O6. Although the a-axis, the b-axis, and the c-axis are typically orthogonal to each other, the present disclosure is not limited thereto, and the axes may intersect at an angle within, for example, a range of 80° or more and 100° or less.

As described above, the liquid discharge unit 300 has the head 310, the pressure adjustment valve 320, and the sensor 330. These portions are supported by a support 350 illustrated by a dashed double-dotted line in FIG. 3.

The support 350 is made of, for example, a metal material or the like, and is a substantially rigid body. In FIG. 3, the support 350 has a flat box shape, but a shape of the support 350 is not particularly limited and is any shape.

The above support 350 is attached to the tip portion of the arm 220, that is, the arm component 226. Thus, each of the head 310, the pressure adjustment valve 320, and the sensor 330 is fixed to the arm component 226.

In the example illustrated in FIG. 3, the pressure adjustment valve 320 is positioned in the c1 direction with respect to the head 310. The sensor 330 is positioned in the a2 direction with respect to the head 310.

The supply flow path 420 is divided into an upstream flow path 421 and a downstream flow path 422 by the pressure adjustment valve 320. That is, the supply flow path 420 has the upstream flow path 421 that communicatively couples the liquid reservoir 410 and the pressure adjustment valve 320, and the downstream flow path 422 that communicatively couples the pressure adjustment valve 320 and the head 310. In the example illustrated in FIG. 3, a part of the downstream flow path 422 of the supply flow path 420 is formed by a flow path member 422*a*. The flow path member 422*a* has a flow path for distributing the ink from the pressure adjustment valve 320 to a plurality of locations of the head 310. The flow path member 422*a* is, for example, a stacked body of a plurality of substrates made of a resin material, and a groove or a hole for a flow path of the ink is appropriately provided in each substrate.

The head 310 has a nozzle surface F and a plurality of nozzles N opened to the nozzle surface F. In the example illustrated in FIG. 3, a normal direction of the nozzle surface F is the c2 direction, and the plurality of nozzles N are divided into a first nozzle array La and a second nozzle array Lb arranged at intervals in a direction along the a-axis. Each of the first nozzle array La and the second nozzle array Lb is a set of the plurality of nozzles N linearly arrayed in a direction along the b-axis. Here, in the head 310, elements related to each nozzle N of the first nozzle array La and elements related to each nozzle N of the second nozzle array Lb are substantially symmetrical with each other in a direction along the a-axis.

However, positions of the plurality of nozzles N in the first nozzle array La and the plurality of nozzles N in the second nozzle array Lb in the direction along the b-axis may or may not coincide with each other. The elements related to each nozzle N of one of the first nozzle array La and the second nozzle array Lb may be omitted. Hereinafter, a configuration in which the positions of the plurality of nozzles N in the first nozzle array La and the plurality of nozzles N in the second nozzle array Lb in the direction along the b-axis coincide with each other is exemplified.

In the present embodiment, a nozzle density of each nozzle N included in each nozzle array in the direction along the b-axis is 300 npi (number of nozzles/inch). However, the present disclosure is not limited thereto, and the nozzle density may be a lower nozzle density, and may be greater than or equal to 25 npi from the viewpoint of printing quality and efficiency. When the head 310 having such a nozzle density is used, the effect of the present disclosure becomes remarkable since it is easily affected by vibration to be described later. In order to realize such a nozzle density, the nozzles N may be arranged in a staggered manner in each nozzle array.

Figure 4:
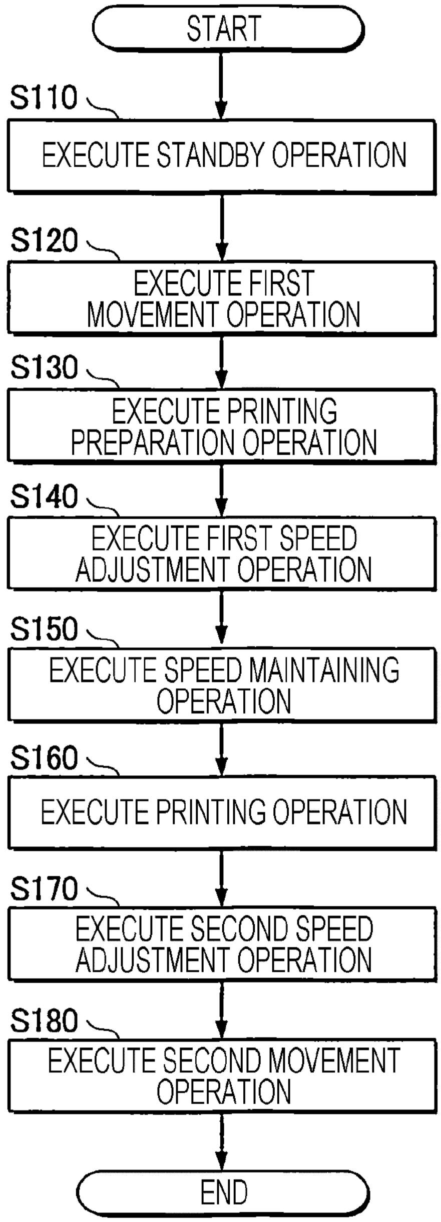
FIG. 4 is a diagram illustrating a flowchart illustrating a flow of a three-dimensional object printing method according to the first embodiment.
Figure 5:
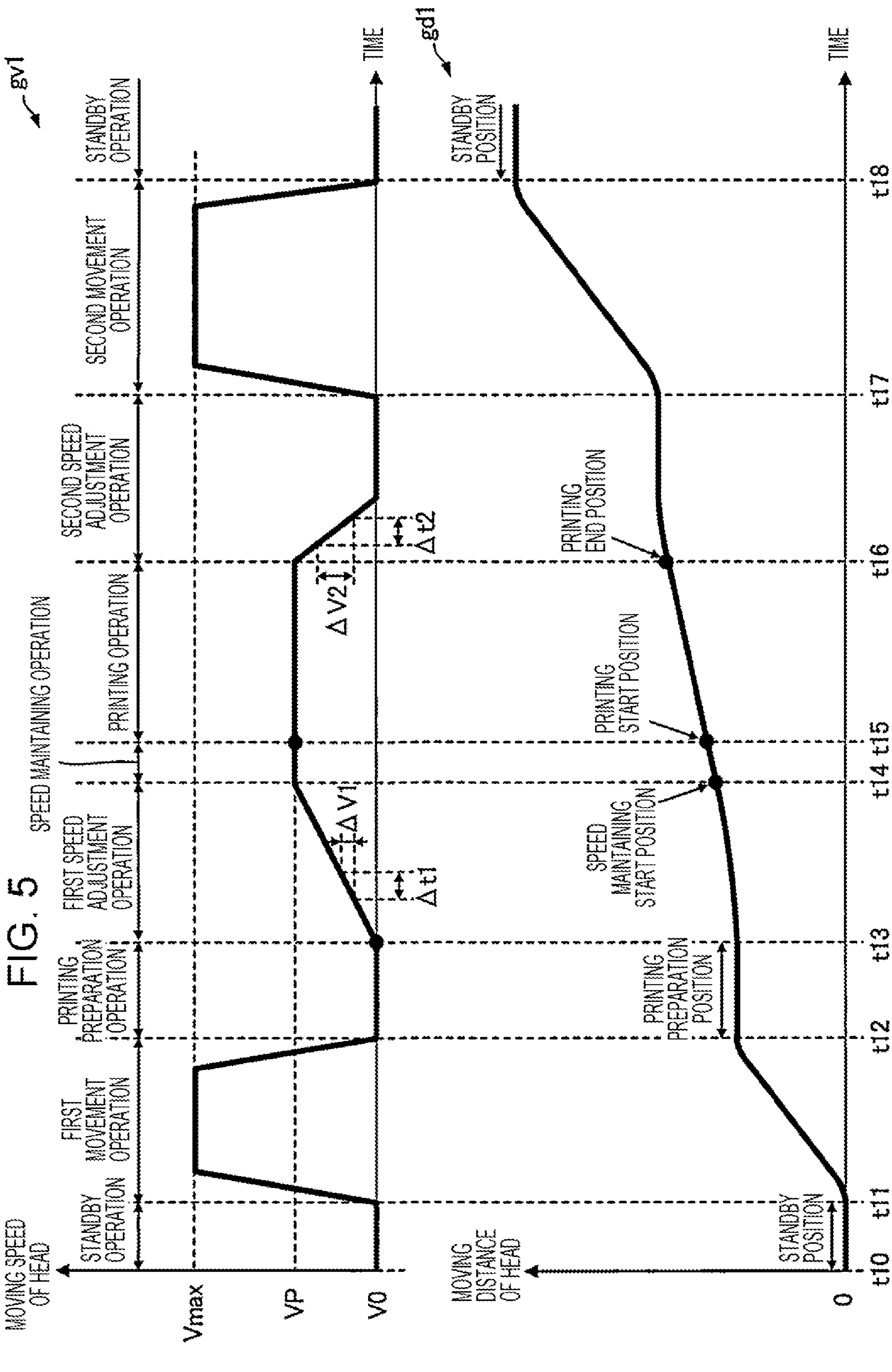
FIG. 5 is an explanatory diagram illustrating a series of operations during execution of the three-dimensional object printing method.

1-4. Operation of Three-Dimensional Object Printing Apparatus and Three-Dimensional Object Printing Method FIG. 4 is a flowchart illustrating a flow of a three-dimensional object printing method according to the first embodiment. FIG. 5 is an explanatory diagram illustrating a series of operations during execution of the three-dimensional object printing method. The three-dimensional object printing method is performed by using the above-mentioned three-dimensional object printing apparatus 100. In FIG. 5, a graph gv1 representing a relationship between a time at which each operation of the series of operations during the execution of the three-dimensional object printing method is executed and the moving speed of the head 310, and a graph gd1 representing a relationship between a time at which each operation of the series of operations is executed and the moving distance of the head 310 are illustrated.

As illustrated in FIGS. 4 and 5, the three-dimensional object printing apparatus 100 executes, as the series of operations during the execution of the three-dimensional object printing method, step S110 of performing a standby operation, step S120 of performing a first movement operation, step S130 of performing a printing preparation operation, step S140 of performing a first speed adjustment operation, step S150 of performing a speed maintaining operation, step S160 of performing a printing operation, step S170 of performing a second speed adjustment operation, and step S180 of performing a second movement operation in this order. The operations illustrated in FIGS. 4 and 5 are executed by the computer 700 controlling the robot 200 and the liquid discharge unit 300 via the controller 600 and the control module 500. The first movement operation is an example of "a movement operation in which the robot moves the head from a standby position to a printing preparation position".

The standby operation of step S110 is an operation in which the head 310 is caused to stand by. A position where the head 310 is caused to stand by is typically a position where the nozzle surface F is covered with the cap portion 820. Hereinafter, the position where the head 310 is caused to stand by is referred to as a "standby position", and the position where the nozzle surface F is covered with the cap portion 820 is referred to as a "cap position". Since the head 310 is at the cap position, it is possible to reduce the thickening or solidification of the ink on the nozzle surface F even though the printing operation is not executed for a long period. However, the standby position is not limited to the cap position, and may be any position in a space where the robot 200 is installed. As represented in the graph gv1, the head 310 does not move from time t10 to time t11, and as represented in the graph gd1, the head 310 is caused to stand by at the standby position.

The first movement operation of step S120 is an operation in which the robot 200 moves the head 310 from the standby position to a printing preparation position PP near the workpiece W while the relative position of the head 310 is changed with respect to the workpiece W. Although not illustrated, the standby position is positioned away from the print region WF than the printing preparation position PP. However, the standby position may be a position closer to the print region WF than the printing preparation position PP.

The three-dimensional object printing apparatus 100 executes the first movement operation, for example, when the control module 500 receives the signal D3 and the print data Img. In the first movement operation, the head 310 may be moved at any speed. In order to shorten a period required for the first movement operation, the head 310 may be moved at a maximum speed Vmax. As represented in the graph gv1, the robot 200 accelerates the head 310 to the maximum speed Vmax between time t11 and time t12. The robot 200 maintains the moving speed of the head 310 at the maximum speed Vmax when the moving speed of the head 310 reaches the maximum speed Vmax, and decelerates the head 310 until the moving speed of the head 310 reaches a speed V0 when the head 310 approaches the printing preparation position PP. The speed V0 is the moving speed of the head 310 at the printing preparation position PP, and is 0 meters/seconds.

The printing preparation operation of step S130 is an operation in which the relative movement of the head 310 with respect to the workpiece W is stopped for a fixed period. The printing preparation operation is provided to attenuate the vibration of the head 310 caused by the first movement operation such that the vibration does not remain during the printing operation. The fixed period is, for example, 0.5 seconds. However, the three-dimensional object printing apparatus 100 may not execute the printing preparation operation. As represented in the graph gv1, the head 310 does not move from time t12 to time t13 which is an execution period of the printing preparation operation, and as represented in the graph gd1, the head 310 is stopped at the printing preparation position PP. In the present embodiment, the stopping is a concept including that the head 310 is completely stationary and that the head 310 vibrates minutely with an amplitude of 500 micrometers or less. Such minute vibrations include vibrations caused by control errors and mechanical errors, in addition to the vibrations caused and remaining due to the inertia associated with the movement operation as described above.

The first speed adjustment operation of step S140 is an operation in which the moving speed of the head 310 is adjusted while the robot 200 changes the relative position of the head 310 with respect to the workpiece W. More specifically, in the first speed adjustment operation, the moving speed of the head 310 is adjusted from the speed V0 to a printing speed VP. In the first speed adjustment operation, the pose of the head 310 may also be changed, but the pose of the head 310 may not be changed. The printing speed VP is the moving speed of the head 310 at a printing start position PS, and is a speed greater than the speed V0. As represented in the graph gv1, the robot 200 adjusts the moving speed of the head 310 from the speed V0 to the printing speed VP between time t13 and time t14, and as represented in the graph gd1, the position is moved from the printing preparation position PP to a speed maintaining start position PJ. The robot 200 monotonically increases the moving speed of the head 310 so as to approach the printing speed VP from the speed V0. The monotonous increase in the present specification means a monotonous increase in a broad sense. In the first embodiment, the speed V0 is an example of a "first speed", and the printing speed VP is an example of a "second speed".

The speed maintaining operation of step S150 is an operation in which the vibration caused by maintaining the moving speed of the head 310 at the printing speed VP and accelerating the head 310 in the first speed adjustment operation is reduced while the robot 200 changes the relative position of the head 310 with respect to the workpiece W. However, the three-dimensional object printing apparatus 100 may not execute the speed maintaining operation. The pose of the head 310 may not be changed during the speed maintaining operation, or the pose of the head 310 may be changed within a range equal to or less than the printing operation. As represented in the graph gv1, the moving speed of the head 310 is maintained at the printing speed VP from time t14 to time t15, and as represented in the graph gd1, the head 310 moves from the speed maintaining start position PJ to the printing start position PS.

The printing operation of step S160 is an operation in which the head 310 discharges the ink while the robot 200 changes the relative position and pose of the head 310 with respect to the workpiece W. The start of the printing operation means that the head 310 starts discharging the ink to the workpiece W. The end of the printing operation means that the head 310 stops discharging the ink to the workpiece W. The head 310 may not discharge the ink during the execution of first movement operation of step S120, the printing preparation operation of step S130, the first speed adjustment operation of step S140, the speed maintaining operation of step S150, the second speed adjustment operation of step S170, and the second movement operation of step S180.

Although the number of joints 230 that move in the printing operation among the plurality of joints 230 is not particularly limited, in the printing operation, the head 310 may be moved by the movement of a smaller number of joints 230 than in another operation. As compared to another operation, the deviation of an actual movement route from an ideal movement route of the head 310 is reduced by moving a smaller number of joints 230. In the printing operation according to the present embodiment, the head 310 is moved by the movement of three joints 230 among the six joints 230 of the robot 200. More specifically, in the first embodiment, the robot 200 sets the rotation axes of the joint 230_2, the joint 230_3, and the joint 230_5 to be in a state parallel to the Y-axis during the execution of the printing operation, and moves these joints 230. As described above, although the three-dimensional object printing apparatus sets the rotation axis O2, the rotation axis O3, and the rotation axis O5 to be parallel to each other, the present disclosure is not limited thereto, and for example, the rotation axis O2, the rotation axis O3, and the rotation axis O6 may be parallel to each other.

As represented in the graph gv1, the moving speed of the head 310 is maintained at the printing speed VP from time t15 to time t16, and as represented in the graph gd1, the head 310 moves from the printing start position PS to a printing end position PE. A movement route RU of the head 310 from the first speed adjustment operation to the printing operation will be described with reference to FIG. 6.

Figure 6:
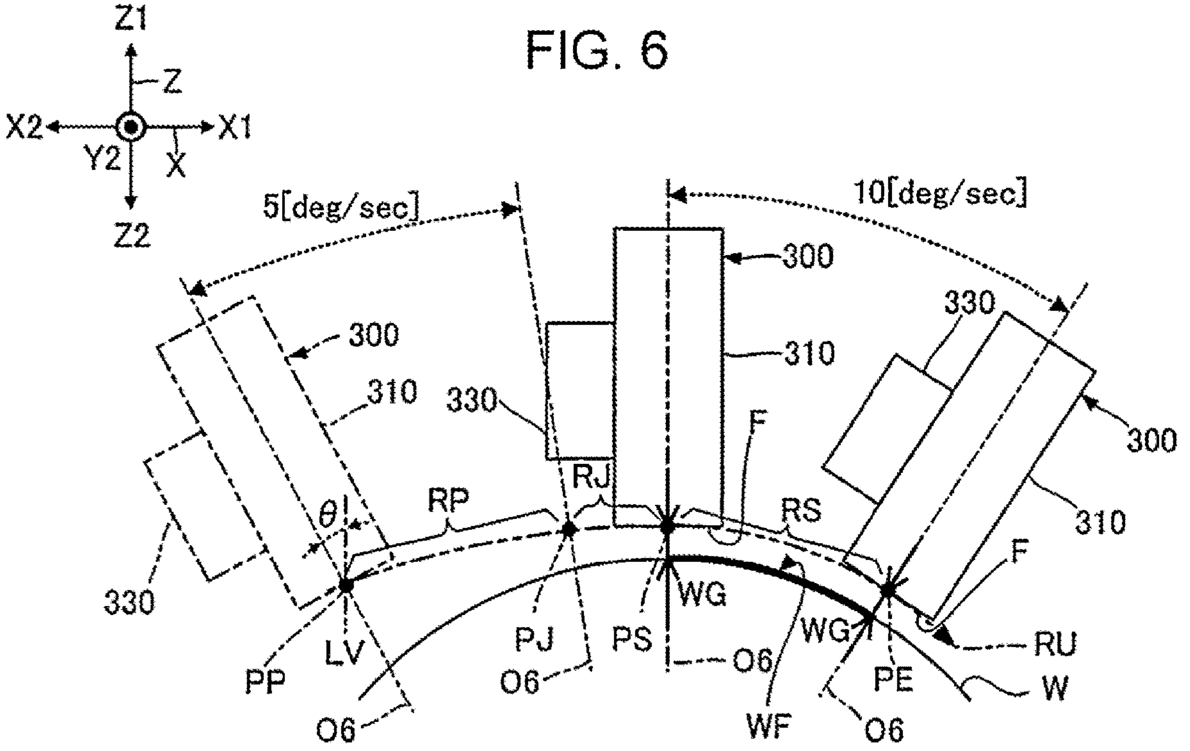
FIG. 6 is an explanatory diagram illustrating a movement route of a head from a first speed adjustment operation to a printing operation.

FIG. 6 is an explanatory diagram illustrating the movement route RU of the head 310 from the first speed adjustment operation to the printing operation. In FIG. 6, the liquid discharge unit 300 positioned at the printing preparation position PP is indicated by a dashed double-dotted line, and the liquid discharge unit 300 positioned at the printing start position PS and the liquid discharge unit 300 positioned at the printing end position PE are indicated by solid lines. In order to avoid complication of the drawing, the display of the liquid discharge unit 300 positioned at the speed maintaining start position PJ is omitted, and only the rotation axis O6 when the liquid discharge unit 300 is positioned at the speed maintaining start position PJ is illustrated. The movement route RU includes a route RP from the printing preparation position PP to the speed maintaining start position PJ, a route RJ from the speed maintaining start position PJ to the printing start position PS, and a route RS from the printing start position PS to the printing end position PE. As illustrated in FIG. 6, since the printing start position PS is positioned at an end portion of the print region WF, the printing start position PS is closer to the print region WF than the printing preparation position PP.

During the execution of the printing operation, the robot 200 moves the joint 230_2, the joint 230_3, and the joint 230_5 such that the b-axis of the tool coordinate system set in the liquid discharge unit 300 and the Y-axis of the base coordinate system are maintained in parallel with each other. That is, during the execution of the printing operation, the robot 200 maintains the first nozzle array La and the second nozzle array Lb to be in parallel with the joint 230_2, the joint 230_3, and the joint 230_5. In other words, during the execution of the printing operation, the robot 200 does not move the joint 230_1, the joint 230_4, and the joint 230_6 which are the joints 230 of which the rotation axes are not parallel to the Y-axis.

In the printing operation, a shortest distance WG between the head 310 and the workpiece W is maintained within a predetermined distance. The shortest distance WG between the head 310 and the workpiece W is also referred to as a "workpiece gap". In the present embodiment, since the curvature of the print region WF is substantially constant, the curvature of the route RS is also substantially constant. On the other hand, the route RP and the route RJ do not follow the shape of the workpiece W and are routes curved more gently than the route RS. The curvatures of the route RP and the route RJ are less than the curvature of the route RS. The curvature is a reciprocal of a radius of a circle when a degree of bending at a certain point is approximated by a circle. The amount of change in the pose of the head 310 per unit period during the execution of the first speed adjustment operation is less than the amount of change in the pose of the head 310 per unit period during the execution of the printing operation. The pose of the head 310 is the pose of the head 310 around the b-axis when viewed along the b-axis. It can be said that the pose of the head 310 is indicated by an angle formed by the rotation axis O6 with respect to a virtual straight line LV along a normal direction of the installation surface BN when viewed along the rotation axis O5. In FIG. 6, the pose of the head 310 when the liquid discharge unit 300 is positioned at the printing preparation position PP is illustrated as an angle θ. When the pose of the head 310 at the printing start position PS of the liquid discharge unit 300 is 0 degrees, a direction in which the rotation axis O6 rotates counterclockwise around the virtual straight line LV is a positive direction and a direction in which the rotation axis O6 rotates clockwise is a negative direction. Regarding the amount of change in the pose of the head 310 per unit period, the unit period may be any period length. The amount of change in the pose of the head 310 per unit period is a value obtained by dividing an absolute value of a value obtained by subtracting an angle indicating the pose of the head 310 at a point in time of the start of a certain unit period from an angle indicating the pose of the head 310 at a point in time of the end of the certain unit period by the length of the unit period. For this division, the dividend is a value greater than or equal to 0 and the divisor is a positive value. Accordingly, the amount of change in the pose of the head 310 is a value greater than or equal to 0. When the execution period of the first speed adjustment operation or the printing operation spans a plurality of unit periods, the amount of change in the pose of the head 310 per unit period is a representative value of the amount of change in the pose of the head 310 in each of the plurality of unit periods. The representative value is, for example, an average value, a maximum value, or a median value. When the representative value is the average value, the amount of change in the pose of the head 310 per unit period is the average value of the amount of change in the pose of the head 310 in each of the plurality of unit periods. For example, when the execution period of the printing operation spans two unit periods, the amount of change in the pose of the head 310 in a first unit period is 10 degrees/seconds, and the amount of change in the pose of the head 310 in a second unit period is 20 degrees/seconds, the amount of change in the pose of the head 310 per unit period is (10+20)/2=15 degrees/seconds. When the representative value is the maximum value, the amount of change in the pose of the head 310 per unit period is a maximum value of the amount of change in the pose of the head 310 in each of the plurality of unit periods. For example, when the execution period of the printing operation spans two unit periods, the amount of change in the pose of the head 310 in the first unit period is 10 degrees/seconds, and the amount of change in the pose of the head 310 in the second unit period is 20 degrees/seconds, the amount of change in the pose of the head 310 per unit period is Max(10, 20)=20 degrees/seconds. However, Max( ) is a function that outputs a value of a maximum argument among one or more arguments.

In the example of FIG. 6, the amount of change in the pose of the head 310 per unit period during the execution of the first speed adjustment operation is 5 degrees/seconds, and the amount of change in the pose of the head 310 per unit period during the execution of the printing operation is 10 degrees/seconds. Accordingly, the amount of change in the pose of the head 310 per unit period during the execution of the first speed adjustment operation is less than the amount of change in the pose of the head 310 per unit period during the execution of the printing operation. In the drawings, the unit of the angle is described as "deg" and the unit of the second is described as "sec".

In the first embodiment, a condition in which the amount of change in the pose of the head 310 around the b-axis per unit movement amount in the first speed adjustment operation is less than the amount of change in the pose of the head 310 around the b-axis per unit movement amount in the printing operation is satisfied. The unit movement amount may be any length. The amount of change in the pose of the head 310 around the b-axis per unit movement amount is a value obtained by dividing an absolute value of a value obtained by subtracting an angle indicating the pose of the head 310 around the b-axis before the head 310 moves by the unit movement amount from an angle indicating the pose of the head 310 around the b-axis after the head 310 moves by the unit movement amount by the length of the unit movement amount. The b-axis is an example of an "array direction of the plurality of nozzles".

The description is returned to FIGS. 4 and 5. The second speed adjustment operation of step S170 is an operation in which the robot 200 decelerates the head 310 from the printing end position PE while the relative position of the head 310 is changed with respect to the workpiece W after the printing operation. As represented in the graph gv1, from time t16 to time t17, the moving speed of the head 310 is decelerated from the printing speed VP to 0 meters/seconds which is the speed V0.

In the second speed adjustment operation, since the printing operation is ended, there is no problem even though the head 310 vibrates significantly after the end of the second speed adjustment operation. Accordingly, an absolute value of an acceleration of the head 310 in the second speed adjustment operation may be greater than an absolute value of an acceleration of the head 310 in the first speed adjustment operation. In the example of FIG. 6, an absolute value of a speed change ΔV2 with respect to a minute period Δt2 in the second speed adjustment operation is greater than an absolute value of a speed change ΔV1 with respect to a minute period Δt1 in the first speed adjustment operation. The minute period Δt1 and the minute period Δt2 have substantially the same period length. The speed change ΔV1 with respect to the minute period Δt1 is an example of an "acceleration of the head in the first speed adjustment operation", and the speed change ΔV2 with respect to the minute period Δt2 is an example of an "acceleration of the head in the second speed adjustment operation".

The second movement operation of step S180 is an operation in which the head 310 is moved to the standby position while the robot 200 changes the relative position of the head 310 with respect to the workpiece W. In the second movement operation, the head 310 may be moved at any speed. In order to shorten a period required for the second movement operation, the head 310 may be moved at the maximum speed Vmax. As represented in the graph gv1, the robot 200 accelerates the head 310 to the maximum speed Vmax between time t17 and time t18. The robot 200 maintains the moving speed of the head 310 at the maximum speed Vmax when the moving speed of the head 310 reaches the maximum speed Vmax, and decelerates the head 310 until the moving speed reaches 0 when the head 310 approaches the standby position. As represented in the graph gd1, the head 310 reaches the standby position at time t18.

After the processing of step S180 is ended, the head 310 moves to the standby position. For example, when the control module 500 receives the signal D3 and the print data Img, the three-dimensional object printing apparatus 100 executes the first movement operation again.

1.5. Summary of First Embodiment

As described above, the three-dimensional object printing apparatus 100 includes the head 310 that discharges the ink to the print region WF on the three-dimensional workpiece W, and the robot 200 that supports the head 310 and changes the relative positions and poses of the workpiece W and the head 310. The three-dimensional object printing apparatus 100 executes the first speed adjustment operation and the printing operation. In the first speed adjustment operation, the moving speed of the head 310 is adjusted while the position of the head 310 is moved from the printing preparation position PP toward the printing start position PS closer to the print region WF than the printing preparation position PP. In the printing operation, a printing operation in which the head 310 starts discharging the ink to the print region WF at the printing start position PS, and a printing operation in which the robot changes the position and the pose of the head 310 while the ink is discharged from the head 310 are executed. The amount of change in the pose of the head 310 per unit period during the execution of the first speed adjustment operation is less than the amount of change in the pose of the head 310 per unit period during the execution of the printing operation. When the pose of the head 310 is changed, a large rotation occurs in the joint 230, and the vibration caused in the joint 230 propagates to the head 310 via the arm 220 to vibrate the head 310. When the head 310 vibrates, a difference is generated between an ideal route of the head 310 and an actual route of the head 310, print image quality deteriorates. In particular, the vibration caused before the printing operation remains even during the printing operation, and the printing quality deteriorates. Here, since the head 310 does not discharge the ink before the printing operation, it is not essential to change the pose of the head 310 corresponding to the shape of the workpiece W. In the first embodiment, the amount of change in the pose of the head 310 per unit period during the execution of the first speed adjustment operation is less than the amount of change in the pose of the head 310 per unit period during the execution of the printing operation, in other words, in the first speed adjustment operation executed before the printing operation, the head 310 moves along a route having a degree of bending gentler than a route along the workpiece W. In the first speed adjustment operation, the head 310 moves along the route having the degree of bending gentler than the route along the workpiece W, and thus, the amount of change in the pose of the head 310 per unit period is reduced. Accordingly, the vibration caused in the joint 230 can be suppressed as compared with a reference example. In order to describe in more detail that the vibration can be suppressed, a movement route RUa in the reference example will be described with reference to FIG. 7, the amount of change in the pose of the head 310 in the first embodiment and the reference example will be described with reference to FIG. 8, and the vibration caused in the joint 230_1 will be described with reference to FIGS. 9 and 10.

Figure 7:
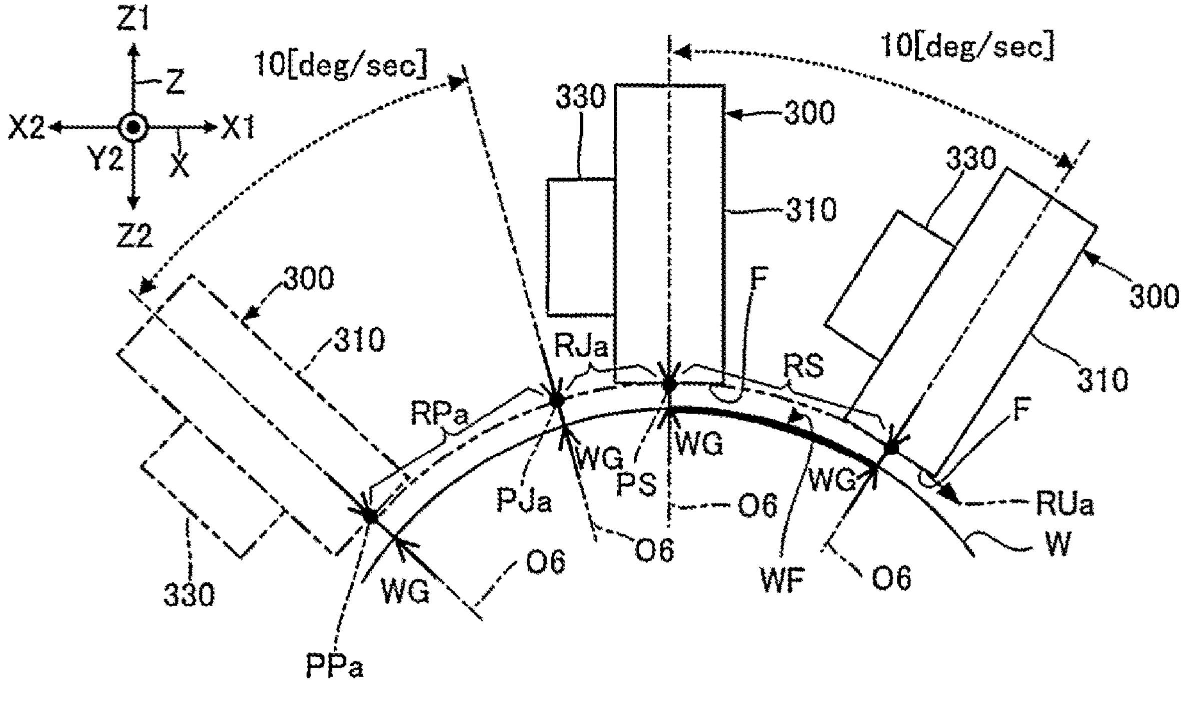
FIG. 7 is an explanatory diagram illustrating a movement route in a reference example.

FIG. 7 is an explanatory diagram illustrating the movement route RUa in the reference example. The entire movement route RUa that follows the shape of the workpiece W is different from the movement route RU which is the route that partially follows the shape of the workpiece W. More specifically, the movement route RUa is different from the movement route RU in that the movement route RUa has a route RPa instead of the route RP and has a route RJa instead of the route RJ. The route RPa is a route from a printing preparation position PPa to a speed maintaining start position PJa. The route RJa is a route from the speed maintaining start position PJa to the printing start position PS. Since the entire movement route RUa follows the shape of the workpiece W, the shortest distance WG between the printing preparation position PPa and the workpiece W and the shortest distance WG between the speed maintaining start position PJa and the workpiece W are within a predetermined distance.

Similarly to FIG. 6, in FIG. 7, the liquid discharge unit 300 positioned at the printing preparation position PPa is indicated by a dashed double-dotted line, and the liquid discharge unit 300 positioned at the printing start position PS and the liquid discharge unit 300 positioned at the printing end position PE are illustrated by solid lines. In order to avoid complication of the drawing, the display of the liquid discharge unit 300 positioned at the speed maintaining start position PJa is omitted, and only the rotation axis O6 when the liquid discharge unit 300 is positioned at the speed maintaining start position PJ is illustrated.

As illustrated in FIG. 7, in the reference example, the amount of change in the pose of the head 310 per unit period during the execution of the first speed adjustment operation is 10 degrees/seconds, and the amount of change in the pose of the head 310 per unit period during the execution of the printing operation is 10 degrees/seconds. Accordingly, in the reference example, the amount of change in the pose of the head 310 per unit period during the execution of the first speed adjustment operation is substantially the same as the amount of change in the pose of the head 310 per unit period during the execution of the printing operation.

Figure 8:
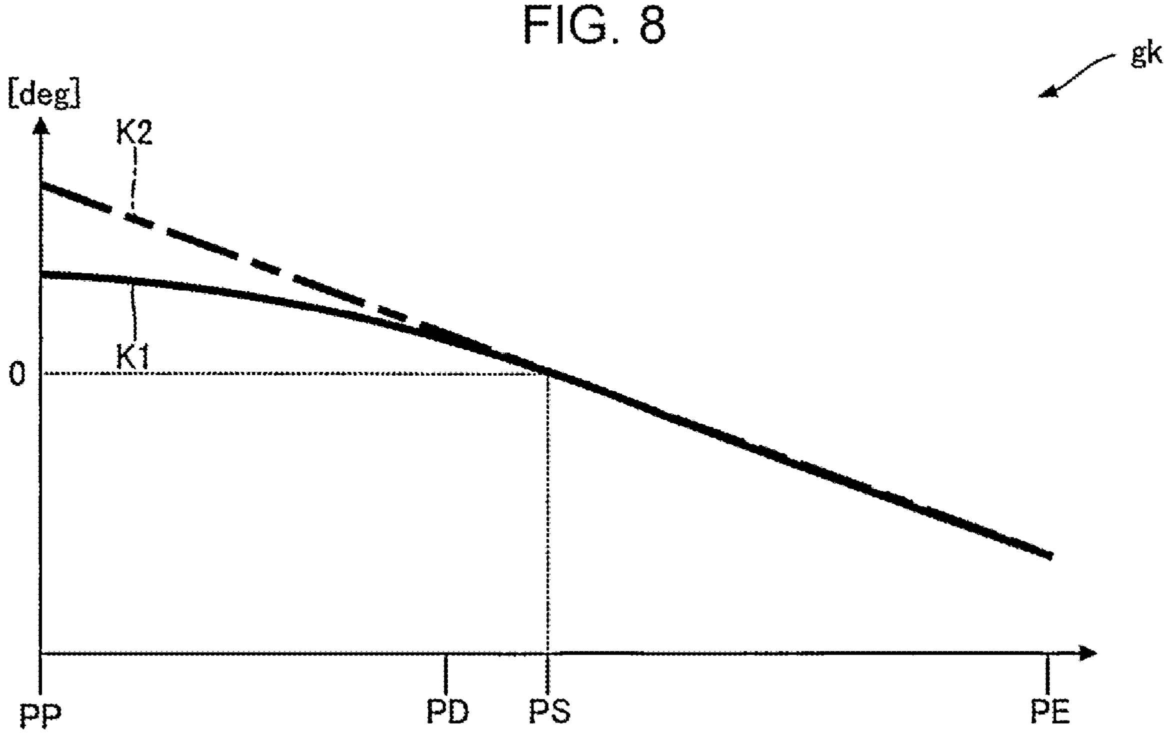
FIG. 8 is an explanatory diagram illustrating a pose of the head from the first speed adjustment operation to the printing operation.

FIG. 8 is an explanatory diagram illustrating the pose of the head 310 from the first speed adjustment operation to the printing operation. In a graph gk shown in FIG. 8, a horizontal axis represents a moving distance of the head 310 from the first speed adjustment operation to the printing operation, and a vertical axis represents the pose of the head 310. The graph gk represents a pose characteristic K1 indicating a pose characteristic of the head 310 in the first embodiment and a pose characteristic K2 indicating a pose characteristic of the head 310 in the reference example. In the first embodiment and the reference example, the pose of the head 310 at the printing start position PS is 0 degrees. As indicated by the pose characteristic K2, in the reference example, an inclination of the pose characteristic K2 is constant from the first speed adjustment operation to the printing operation. On the other hand, as indicated by the pose characteristic K1, in the first speed adjustment operation in which the head 310 is accelerated, since an inclination of the pose characteristic K1 is gentle and the pose of the head 310 follows the shape of the workpiece W after the printing start position PS, the inclination of the pose characteristic K1 is constant.

Figure 9:
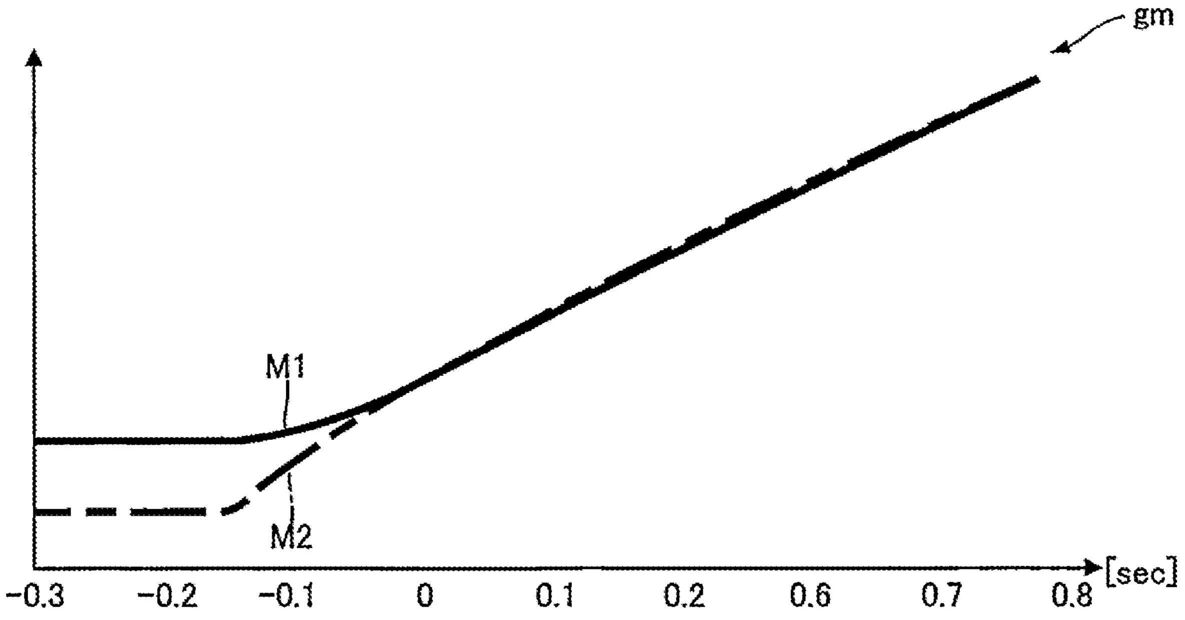
FIG. 9 is a diagram illustrating an output signal with respect to an elapsed time.

FIG. 9 is a diagram illustrating an output signal D1_5 with respect to an elapsed time. The output signal D1_5 indicates a rotation amount of the rotation axis O5. A graph gm shown in FIG. 9 represents a pulse value indicated by the output signal D1_5 at each time of a period including a time at which the head 310 is positioned at the printing start position PS. In the graph gm, the time at which the head 310 is positioned at the printing start position PS is set to 0, and the unit of the seconds which is the time is expressed as [sec]. The graph gm represents a rotation amount characteristic M1 indicating a characteristic of the rotation amount of the rotation axis O5 in the first embodiment, and a rotation amount characteristic M2 indicating a characteristic of the rotation amount of the rotation axis O5 in the reference example. In the reference example, as indicated by the rotation amount characteristic M2, since an absolute value of the rotation amount of the rotation axis O5 with the passage of time is large before the printing operation, the vibration is caused in the joint 230_5. On the other hand, in the first embodiment, as indicated by the rotation amount characteristic M1, a change in the rotation amount of the rotation axis O5 with the passage of time is suppressed as compared with the reference example. Since the change in the rotation amount of the rotation axis O5 is suppressed, the vibration caused in the joint 230_5 is suppressed, and the vibration of the head 310 can be suppressed.

Although the rotation amount of the rotation axis O5 is illustrated in FIG. 9, the description of the rotation axis O5 is applied to the rotation axis O2 and the rotation axis O3. That is, in the reference example, since an absolute value of a rotation amount of the rotation axis O2 and an absolute value of a rotation amount of the rotation axis O3 with the passage of time are large, the vibration is caused in the joint 230_2 and the joint 230_3. On the other hand, in the first embodiment, a change in the rotation amount of the rotation axis O2 and a change in the rotation amount of the rotation axis O3 with the passage of time are suppressed as compared with the reference example.

Figure 10:
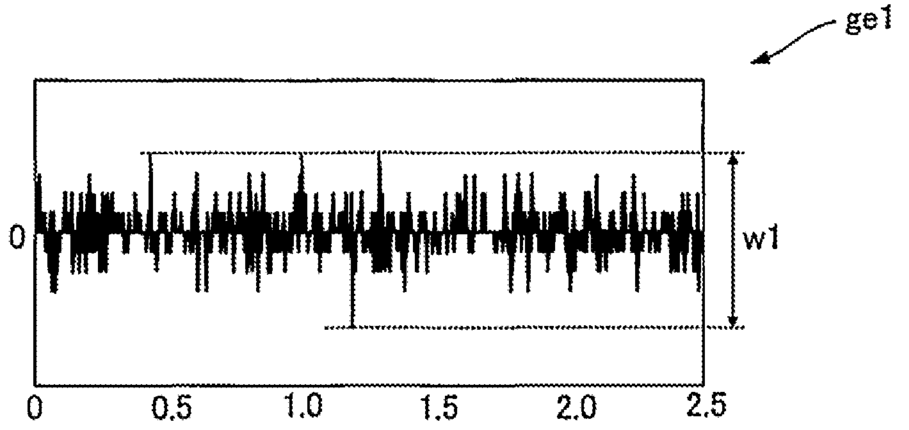
FIG. 10 is a diagram illustrating strength of vibration of a joint according to the first embodiment.
Figure 11:
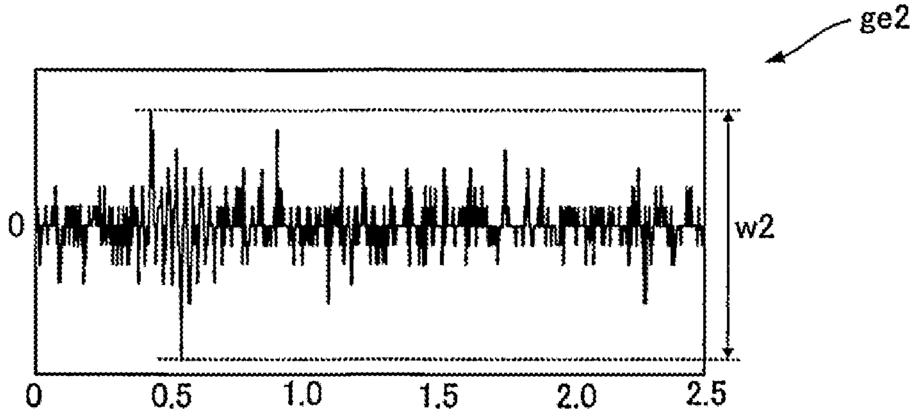
FIG. 11 is a diagram illustrating strength of vibration of a joint in the reference example.

FIG. 10 is a diagram illustrating the strength of the vibration of the joint 230_1 according to the first embodiment. FIG. 11 is a diagram illustrating the strength of the vibration of the joint 230_1 in the reference example. FIG. 10 illustrates the output signal D1_1 of the encoder 241_1 during the execution of the printing operation of the first embodiment, and FIG. 11 illustrates the output signal D1_1 of the encoder 241_1 in the reference example. In the printing operation in the first embodiment and the printing operation in the reference example, the motor included in the joint 230_1 does not operate, and the driving force for rotating the arm component 221 is not generated. However, due to the vibration caused in the joint 230, the arm component 221 rotates around the rotation axis O1 with an extremely small amount.

A graph ge1 shown in FIG. 10 represents the output signal D1_1 during the execution of the printing operation. A horizontal axis of the graph ge1 indicates an elapsed time from a point in time of the start of the printing operation, and a vertical axis of the graph ge1 indicates a pulse value indicated by the encoder 241_1. Similarly, the graph ge2 shown in FIG. 11 represents the output signal D1_1 during the execution of the printing operation of the reference example. A horizontal axis of the graph ge2 represents an elapsed time from a point in time of the start of the printing operation, and a vertical axis of the graph ge2 represents a pulse value indicated by the output signal D1_1.

As represented in the graph ge1 and the graph ge2, since the arm component 221 rotates around the rotation axis O1 with an extremely small amount due to the vibration caused in the joint 230, the pulse value also vibrates. A pulse value of 0 indicates that the arm component 221 does not rotate, and a large absolute value of the pulse value indicates that the arm component 221 rotates with a relatively large amount. Accordingly, it can be said that an amplitude of the vibration of the pulse value indicates the strength of the vibration caused in the joint 230_1.

A maximum amplitude of the vibration of the pulse value in the graph ge1 is a width w1, and a maximum amplitude of the vibration of the pulse value in the graph ge2 is a width w2. The width w1 is narrower than the width w2. Accordingly, the first embodiment can suppress the vibration caused in the joint 230 as compared with the reference example.

The first speed adjustment operation is an operation in which the moving speed of the head 310 is adjusted from the speed V0 which is the speed at the printing preparation position PP to the printing speed VP which is the speed at the printing start position PS while the position of the head 310 is moved from the printing preparation position PP toward the printing start position PS. In a period from time t13 to time t14 during the execution of the first speed adjustment operation, the moving speed of the head 310 monotonically increases from the speed V0 to the printing speed VP. Since the moving speed of the head 310 increases monotonically, acceleration and deceleration are not repeated. The acceleration and deceleration are not repeated, and thus, the vibration of the head 310 is suppressed. Accordingly, the printing quality can be improved.

The three-dimensional object printing apparatus 100 executes the speed maintaining operation in which the head 310 is moved toward the printing start position PS while the moving speed of the head 310 is maintained at the printing speed VP in a period between the first speed adjustment operation and the printing operation. Since a fluctuation in the speed immediately before the ink is discharged can be suppressed by executing the speed maintaining operation, the three-dimensional object printing apparatus 100 can improve the printing quality. From the viewpoint of suppressing the deterioration in the printing quality due to the vibration of the head 310, the amount of change in pose of the head 310 per unit period during the execution of the speed maintaining operation may be equal to the amount of change in the pose of the head 310 per unit period during the execution of the printing operation or may be less than the amount of change in the pose of the head 310 per unit period during the execution of the printing operation.

The three-dimensional object printing apparatus 100 executes the standby operation in which the robot 200 causes the head 310 to stand by at the standby position away from the print region than the printing preparation position PP and the movement operation in which the robot 200 moves the head 310 from the standby position to the printing preparation position PP before the first speed adjustment operation. When the workpiece W is set to a position where the three-dimensional object printing apparatus 100 can print, the head 310 is usually caused to stand by at the standby position. It is possible to prevent the head 310 from interfering with the workpiece when the workpiece W is installed by causing the head 310 to stand by at the standby position away from the workpiece W. The standby position is the cap position, and thus, it is possible to prevent the nozzle N from being dried and solidified.

The three-dimensional object printing apparatus 100 executes the printing preparation operation in which the relative movement of the head 310 with respect to the workpiece W is stopped for a predetermined period at the printing preparation position PP before the first speed adjustment operation. The vibration caused by the first movement operation can be attenuated by stopping the movement of the head 310 for a predetermined period.

As described above, in the first speed adjustment operation, the moving speed of the head 310 monotonically increases from the speed V0 to the printing speed VP. Since the moving speed monotonically increases, the printing speed VP is greater than the speed V0. As described above, in the first speed adjustment operation, since the moving speed is accelerated from 0 meters/seconds which is the speed V0, the printing operation can be started in a state where the vibration caused before the first speed adjustment operation is attenuated. Thus, the printing quality can be improved.

The three-dimensional object printing apparatus 100 executes the second speed adjustment operation in which the head 310 stops discharging the ink and changes the moving speed of the head 310, subsequently to the printing operation. The absolute value of the acceleration of the head 310 in the second speed adjustment operation is greater than the absolute value of the acceleration of the head 310 in the first speed adjustment operation. In the first speed adjustment operation, the absolute value of the acceleration of the head 310 is suppressed in comparison with the absolute value of the head 310 in the second speed adjustment operation, and thus, the vibration of the head 310 can be suppressed and the printing quality can be improved. On the other hand, in the second speed adjustment operation, the absolute value of the acceleration of the head 310 is set to be greater than the absolute value of the acceleration of the head 310 in the first speed adjustment operation, and thus, a tact time required for manufacturing the product is shortened. Accordingly, the productivity of the product can be improved.

The amount of change in the pose of the head 310 around the b-axis per unit movement amount in the first speed adjustment operation is less than the amount of change in the pose of the head 310 around the b-axis per unit movement amount in the printing operation. According to the first embodiment, the vibration caused in the joint 230 can be suppressed as compared with the aspect in which the amount of change in the pose of the head 310 around the b-axis per unit movement amount in the first speed adjustment operation is greater than the amount of change in the pose of the head 310 around the b-axis per unit movement amount in the printing operation.

2. Second Embodiment

A three-dimensional object printing method according to a second embodiment is different from the first embodiment in that the printing preparation operation and the second speed adjustment operation are not executed. Hereinafter, the second embodiment of the present disclosure will be described.

Figure 12:
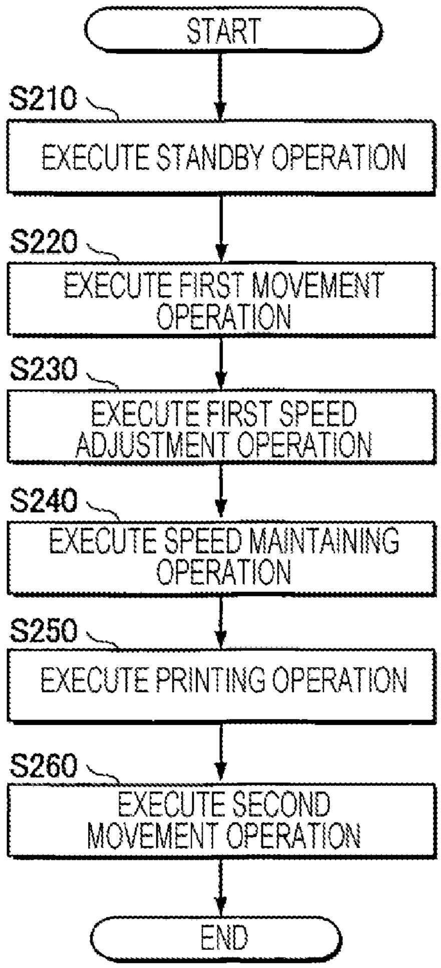
FIG. 12 is a diagram illustrating a flowchart illustrating a flow of a three-dimensional object printing method according to a second embodiment.
Figure 13:
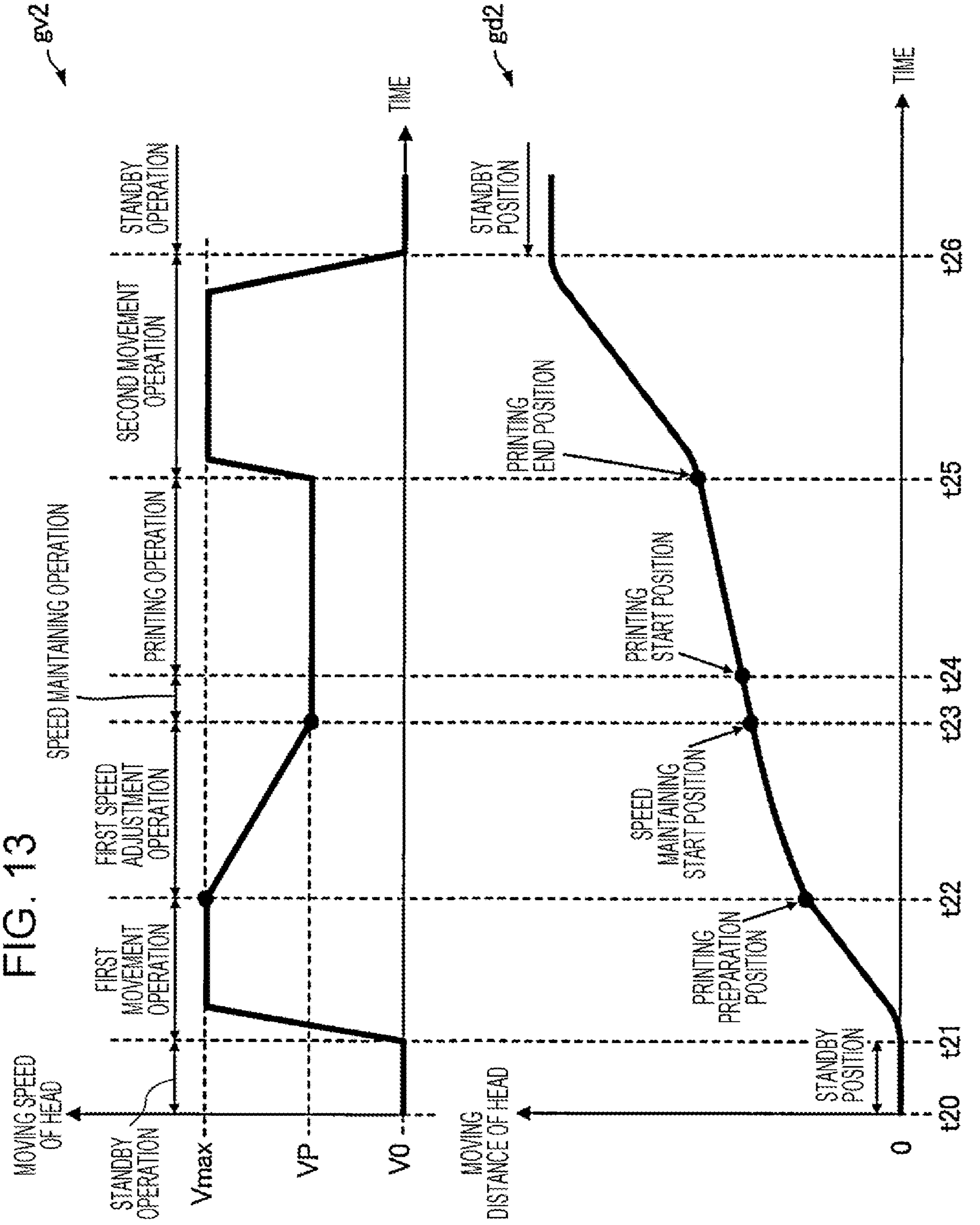
FIG. 13 is an explanatory diagram illustrating a series of operations during execution of the three-dimensional object printing method according to the second embodiment.

FIG. 12 is a flowchart illustrating a flow of the three-dimensional object printing method according to the second embodiment. FIG. 13 is an explanatory diagram illustrating a series of operations during the execution of the three-dimensional object printing method according to the second embodiment. In FIG. 13, a graph gv2 representing a relationship between a time at which each operation of the series of operations during the execution of the three-dimensional object printing method according to the second embodiment is executed and the moving speed of the head 310, and a graph gd2 representing a relationship between a time at which each operation of the series of operations is executed and the moving distance of the head 310 are illustrated. The moving distance of the head 310 means the moving distance of the head 310 from a point in time at which the execution of the three-dimensional object printing method is started.

As illustrated in FIGS. 12 and 13, a three-dimensional object printing apparatus 100 according to the second embodiment executes, as the series of operations during the execution of the three-dimensional object printing method according to the second embodiment, step S210 of performing the standby operation, step S220 of performing the first movement operation, step S230 of performing the first speed adjustment operation, step S240 of performing the speed maintaining operation, step S250 of performing the printing operation, and step S260 of performing the second movement operation in this order.

The standby operation of step S210 is an operation in which the head 310 is caused to stand by before the printing operation. Since the standby operation of step S210 is the same as the standby operation in step S110 in the first embodiment, the description thereof will be omitted. As represented in the graph gv2, the head 310 does not move from time t20 to time t21, and as represented in the graph gd2, the head 310 is caused to stand by at the standby position.

The first movement operation of step S220 is an operation in which the robot 200 moves the head 310 from the standby position to the printing preparation position PP while changing the relative position of the head 310 with respect to the workpiece W before the printing operation. However, the second embodiment is different from the first embodiment in that the head 310 passes through the printing preparation position PP without being stopped. In the second embodiment, the moving speed of the head 310 at the end of the first movement operation is faster than the printing speed VP. Although any speed may be used as long as the moving speed of the head 310 at the end of the first movement operation is faster than the printing speed VP, in order to shorten the period required for the first movement operation, the moving speed of the head 310 at the end of the first movement operation may be the maximum speed Vmax of the head 310. As represented in the graph gv2, the robot 200 accelerates the head 310 to the maximum speed Vmax between time t21 and time t22. When the moving speed of the head 310 reaches the maximum speed Vmax, the robot 200 maintains the moving speed of the head 310 at the maximum speed Vmax until the head 310 passes through the printing preparation position PP.

The first speed adjustment operation of step S230 is an operation in which the moving speed of the head 310 is adjusted while the robot 200 changes the relative position of the head 310 with respect to the workpiece W before the printing operation. More specifically, in the first speed adjustment operation in step S230, the moving speed of the head 310 is adjusted from the maximum speed Vmax to the printing speed VP. The printing speed VP is a speed less than the maximum speed Vmax. As represented in the graph gv2, the robot 200 adjusts the moving speed of the head 310 from the maximum speed Vmax to the printing speed VP between time t22 and time t23, and as represented in the graph gd2, the head 310 moves from the printing preparation position PP to the speed maintaining start position PJ. The robot 200 monotonically decreases the moving speed of the head 310 from the maximum speed Vmax to the printing speed VP. The monotonous decrease in the present specification means a monotonous decrease in a broad sense. In the second embodiment, the maximum speed Vmax is an example of a "first speed", and the printing speed VP is an example of a "second speed".

The speed maintaining operation of step S240 is an operation in which the vibration caused by maintaining the moving speed of the head 310 at the printing speed VP and decelerating the head 310 in the first speed adjustment operation is reduced while the robot 200 changes the relative position of the head 310 with respect to the workpiece W before the printing operation. As represented in the graph gv2, the moving speed of the head 310 is maintained at the printing speed VP from time t23 to time t24, and as represented in the graph gd2, the head 310 moves from the speed maintaining start position PJ to the printing start position PS.

The printing operation of step S250 is an operation in which the head 310 discharges the ink while the robot 200 changes the relative position of the head 310 with respect to the workpiece W. As represented in the graph gv2, the moving speed of the head 310 is maintained at the printing speed VP from time t24 to time t25, and as represented in the graph gd2, the head 310 moves from the printing start position PS to the printing end position PE.

The second movement operation of step S260 is an operation in which the head 310 is moved to the standby position while the robot 200 changes the relative position of the head 310 with respect to the workpiece W. In the second movement operation, the head 310 may be moved at any speed. In order to shorten a period required for the second movement operation, the head 310 may be moved at the maximum speed Vmax. As represented in the graph gv2, the robot 200 accelerates the head 310 to the maximum speed Vmax between time t25 and time t26. The robot 200 maintains the moving speed of the head 310 at the maximum speed Vmax when the moving speed of the head 310 reaches the maximum speed Vmax, and decelerates the head 310 until the moving speed of the head 310 reaches the speed V0 when the head 310 approaches the standby position.

After the processing of step S260 is ended, the head 310 moves to the standby position. For example, when the control module 500 receives the signal D3 and the print data Img, the three-dimensional object printing apparatus 100 according to the second embodiment executes the first movement operation of step S220 again.

Here, the amount of change in the pose of the head 310 per unit period during the execution of the first speed adjustment operation of step S230 is less than the amount of change in the pose of the head 310 per unit period during the execution of the printing operation of step S250. Thus, the vibration caused in the joint 230 can be suppressed and the printing quality can be improved as in the first embodiment.

2.1. Summary of Second Embodiment

As described above, from time t22 to time t23 during the execution of the first speed adjustment operation in the second embodiment, the moving speed of the head 310 monotonically decreases from the maximum speed Vmax to the printing speed VP. Since the moving speed of the head 310 decreases monotonically, acceleration and deceleration are not repeated. The acceleration and deceleration are not repeated, and thus, the vibration of the head 310 can be suppressed. Accordingly, the printing quality can be improved.

As described above, during the execution of the first speed adjustment operation in the second embodiment, the moving speed of the head 310 monotonically decreases from the maximum speed Vmax to the printing speed VP. Since the moving speed monotonically decreases, the printing speed VP is less than the maximum speed Vmax. In the first speed adjustment operation in the second embodiment, an average moving speed of the head 310 in the first speed adjustment operation is greater than in the first speed adjustment operation in the first embodiment. The reason is that the moving speed of the head 310 is decelerated from a speed greater than the printing speed VP in the second embodiment, but the moving speed of the head 310 is accelerated from the speed V0 less than the printing speed VP in the first speed adjustment operation in the first embodiment. Accordingly, in the second embodiment, since the average moving speed of the head 310 in the first speed adjustment operation is greater than in the first embodiment, the three-dimensional object printing apparatus 100 according to the second embodiment can shorten the period required for the first speed adjustment operation. In the first movement operation in the second embodiment, the average moving speed of the head 310 in the first movement operation is greater than in the first movement operation in the first embodiment. The reason is that the moving speed of the head 310 at the end of the first movement operation is the maximum speed Vmax in the second embodiment, but the moving speed of the head 310 at the end of the first movement operation is the speed V0. Accordingly, in the second embodiment, since the average moving speed of the head 310 in the first movement operation is greater than in the first embodiment, the three-dimensional object printing apparatus 100 according to the second embodiment can shorten the period required for the first movement operation. As described above, in the second embodiment, since the period required for the first movement operation and the first speed adjustment operation is shortened as compared with the first embodiment, the tact time required for manufacturing the product can be shortened, and the productivity of the product can be improved. On the other hand, in the first embodiment, since the moving speed is accelerated from 0 meters/seconds which is the speed V0 the first speed adjustment operation, the printing operation can be started in a state where the vibration caused before the first speed adjustment operation is attenuated. Thus, the printing quality can be improved as compared with the second embodiment.

3. Modification Examples

Each of the above-exemplified forms can be variously modified. Specific modification aspects are exemplified below. Two or more aspects randomly selected from the following examples can be appropriately merged without contradicting each other.

3-1. First Modification Example

In the first speed adjustment operation in the first embodiment, although it has been described that the moving speed of the head 310 monotonically increases so as to approach the printing speed VP from the speed V0, the moving speed may approach from the speed V0 to the printing speed VP while repeatedly increases and decreases without monotonically increasing. Similarly, in the first speed adjustment operation in the second embodiment, although it has been described that the moving speed of the head 310 decreases monotonically so as to approach the printing speed VP from the maximum speed Vmax, the moving speed may approach from the maximum speed Vmax to the printing speed VP while repeatedly decreases and increases without monotonically decreasing.

3-2. Second Modification Example

In the first embodiment and the second embodiment, when the standby position and the printing start position PS are close to each other, the three-dimensional object printing apparatus 100 may not execute the first movement operation. When the first movement operation is not executed, assuming that the standby position is the printing preparation position PP, the three-dimensional object printing apparatus 100 adjusts the moving speed of the head 310 while the position of the head 310 is moved from the standby position toward the printing start position PS.

3-3. Third Modification Example

As described in the first embodiment, the printing preparation operation may not be executed. When the printing preparation operation is not executed, the moving speed of the head 310 at the end of the first movement operation and the start of the first speed adjustment operation is not limited to the speed V0, may be greater than the speed V0, and may be a speed less than or equal to the printing speed VP. In the second modification example, the speed greater than the speed V0 and less than or equal to the printing speed VP is an example of a "first speed".

3-4. Fourth Modification Example

In the second embodiment, although it has been described that the maximum speed Vmax is an example of the "first speed", the present disclosure is not limited thereto. For example, the "first speed" may be a speed greater than the printing speed VP and less than the maximum speed Vmax.

3-5. Fifth Modification Example

In the second embodiment, although the three-dimensional object printing apparatus 100 does not execute the second speed adjustment operation, the second speed adjustment operation may be executed between the printing operation and the second movement operation. In the fifth modification example, the absolute value of the acceleration of the head 310 in the second speed adjustment operation may be greater than the absolute value of the acceleration of the head 310 in the first speed adjustment operation.

3-6. Sixth Modification Example

In above-described form, although the configuration using screwing or the like as a method for fixing the head 310 to the tip portion of the arm 220 is exemplified, the present disclosure is not limited to this configuration. For example, the head 310 may be fixed to the tip portion of the arm 220 by gripping the head 310 by a gripping mechanism such as a hand attached to the tip portion of the arm 220.

3-7. Seventh Modification Example

Although a configuration in which printing is performed by using one type of ink is illustrated in the above-described embodiment, the present disclosure is not limited to this configuration, and is applicable to a configuration in which printing is performed by using two or more types of ink.

3-8. Eighth Modification Example

The application of the three-dimensional object printing apparatus of the present disclosure is not limited to printing. For example, a three-dimensional object printing apparatus that discharges a solution of a coloring material is used as a manufacturing apparatus for forming a color filter of a liquid crystal display apparatus. A three-dimensional object printing apparatus that discharges a solution of a conductive material is used as a manufacturing apparatus for forming a wiring and an electrode on a wiring substrate. The three-dimensional object printing apparatus can also be used as a jet dispenser for applying a liquid such as an adhesive to a workpiece.

What is claimed is:

1. A three-dimensional object printing apparatus comprising:

a head that discharges a liquid to a print region on a three-dimensional workpiece; and a robot that supports the head, and changes relative positions and poses of the workpiece and the head, wherein the three-dimensional object printing apparatus is configured to perform a first speed adjustment operation in which a moving speed of the head is adjusted while the robot moves a position of the head from a printing preparation position toward a printing start position closer to the print region than the printing preparation position, and a printing operation in which the head starts discharging the liquid to the print region at the printing start position and the robot changes a position and a pose of the head while the liquid is discharged from the head are executed, and an amount of change in the pose of the head per unit period during the execution of the first speed adjustment operation is less than an amount of change in the pose of the head per unit period during the execution of the printing operation.

2. The three-dimensional object printing apparatus according to claim 1, wherein in the first speed adjustment operation, the moving speed of the head is adjusted to a second speed which is a speed at the printing start position from a first speed which is a speed at the printing preparation position while the position of the head is moved from the printing preparation position toward the printing start position, and the moving speed of the head monotonically increases or monotonically decreases so as to approach from the first speed to the second speed in a period during the execution of the first speed adjustment operation.

3. The three-dimensional object printing apparatus according to claim 2, wherein a speed maintaining operation in which the head is moved toward the printing start position while the moving speed of the head is maintained at the second speed is executed in a period between the first speed adjustment operation and the printing operation.

4. The three-dimensional object printing apparatus according to claim 1, wherein a standby operation in which the robot causes the head to stand by at a standby position away from the print region than the printing preparation position, and a movement operation in which the robot moves the head from the standby position toward the printing preparation position are executed before the first speed adjustment operation.

5. The three-dimensional object printing apparatus according to claim 1, wherein a printing preparation operation in which a relative movement of the head with respect to the workpiece is stopped for a predetermined period at the printing preparation position is executed before the first speed adjustment operation.

6. The three-dimensional object printing apparatus according to claim 1, wherein in the first speed adjustment operation, the moving speed of the head is adjusted to a second speed which is a speed at the printing start position from a first speed which is a speed at the printing preparation position while the position of the head is moved from the printing preparation position toward the printing start position, and the second speed is greater than the first speed.

7. The three-dimensional object printing apparatus according to claim 1, wherein in the first speed adjustment operation, the moving speed of the head is adjusted to a second speed which is a speed at the printing start position from a first speed which is a speed at the printing preparation position while the position of the head is moved from the printing preparation position toward the printing start position, and the second speed is less than the first speed.

8. The three-dimensional object printing apparatus according to claim 1, wherein a second speed adjustment operation in which the head stops discharging the liquid and the moving speed of the head is changed is executed subsequently to the printing operation, and an absolute value of an acceleration of the head in the second speed adjustment operation is greater than an absolute value of an acceleration of the head in the first speed adjustment operation.

9. The three-dimensional object printing apparatus according to claim 1, wherein the head has a plurality of nozzles that discharge the liquid, and an amount of change in the pose of the head around an array direction of the plurality of nozzles per unit movement amount in the first speed adjustment operation is less than an amount of change in the pose of the head around the array direction per unit movement amount in the printing operation.

10. A three-dimensional object printing method using a head that discharges a liquid to a print region on a three-dimensional workpiece, and a robot that supports the head and changes relative positions and poses of the workpiece and the head, the method comprising:

executing a first speed adjustment operation in which a moving speed of the head is adjusted while the robot moves a position of the head from a printing preparation position toward a printing start position closer to the print region than the printing preparation position, and a printing operation in which the head starts discharging the liquid to the print region at the printing start position and the robot moves the head and changes a pose of the head while the liquid is discharged from the head, wherein an amount of change in the pose of the head per unit period during the execution of the first speed adjustment operation is less than an amount of change in the pose of the head per unit period during the execution of the printing operation.

* * * * *